No. 725,630. PATENTED APR. 14, 1903.
G. A. SMITH.
MACHINE FOR SAWING AND ASSORTING BOX STUFF.
APPLICATION FILED MAY 13, 1902.
NO MODEL. 3 SHEETS—SHEET 1.
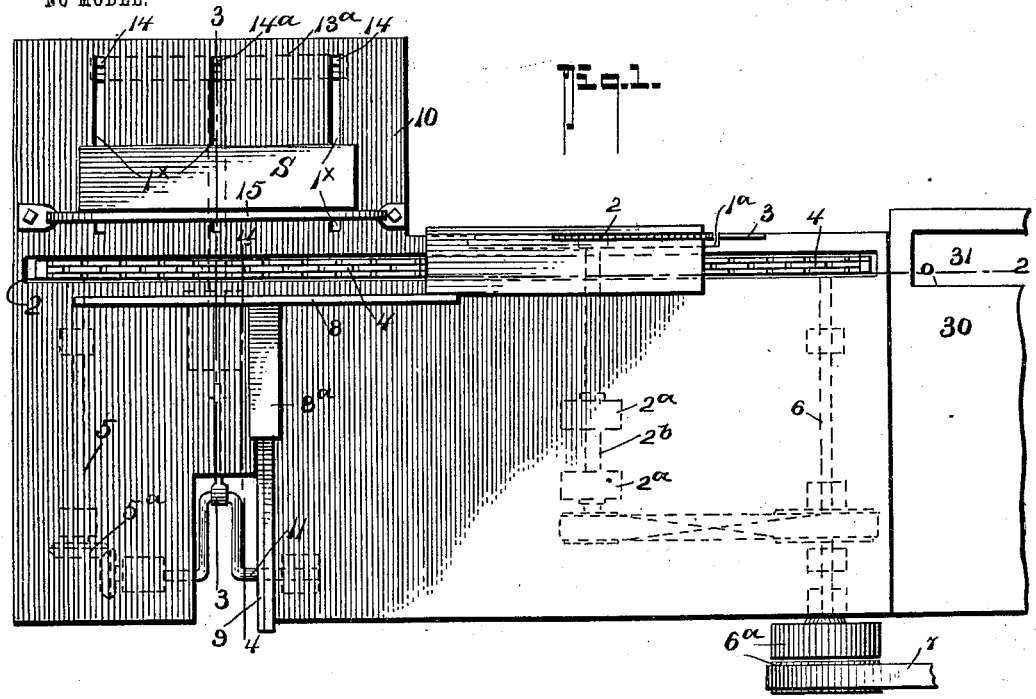
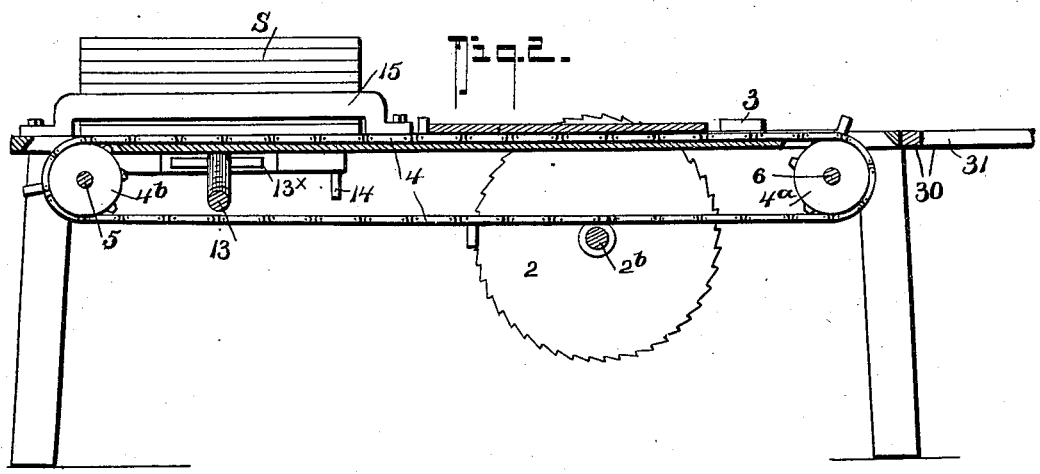
WITNESSES:
Louis Dieterich
Guy V. Worthington
INVENTOR
Geo. A. Smith.
BY
Fred G. Dieterich & Co
ATTORNEYS.

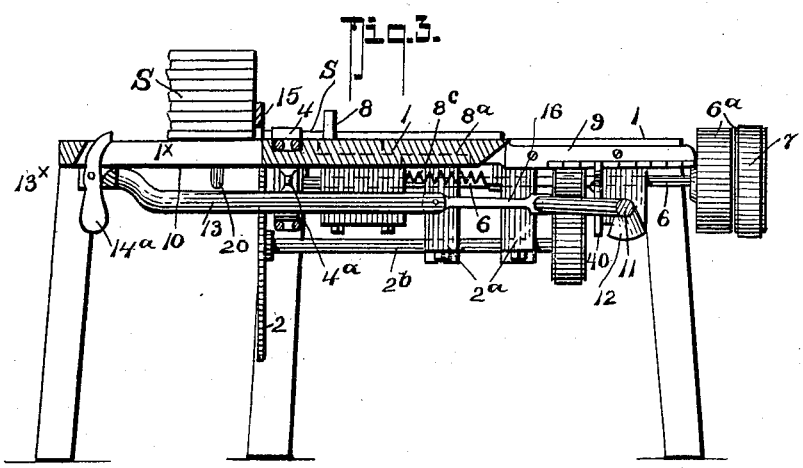

No. 725,630. PATENTED APR. 14, 1903.
G. A. SMITH.
MACHINE FOR SAWING AND ASSORTING BOX STUFF.
APPLICATION FILED MAY 13, 1902.
NO MODEL. 3 SHEETS—SHEET 3.
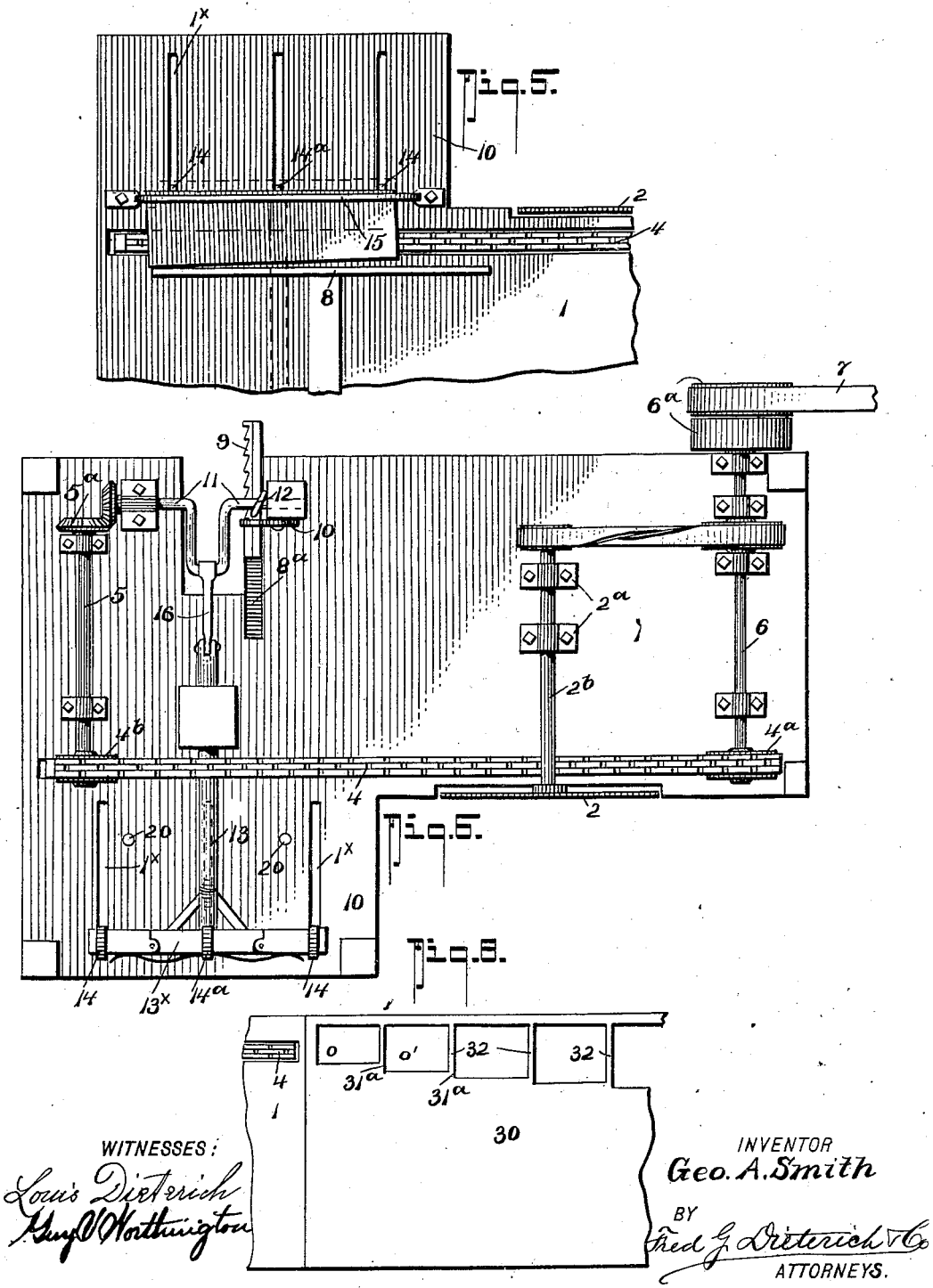
WITNESSES:
Louis Dieterich
Geo. V. Worthington
INVENTOR
Geo. A. Smith
BY
Fred G. Dieterich & Co.
ATTORNEYS.

UNITED STATES PATENT OFFICE.

GEORGE ANDREWS SMITH, OF BELFIELD, VIRGINIA, ASSIGNOR OF ONE-HALF TO W. F. DEAL AND HARRY SCHWARTZ, OF BELFIELD, VIRGINIA.

MACHINE FOR SAWING AND ASSORTING BOX STUFF.

SPECIFICATION forming part of Letters Patent No. 725,630, dated April 14, 1903.

Application filed May 13, 1902. Serial No. 107,079. (No model.)

*To all whom it may concern:*

Be it known that I, GEORGE ANDREWS SMITH, residing at Belfield, in the county of Greenesville and State of Virginia, have invented a new and Improved Machine for Sawing and Assorting Box Stuff, of which the following is a specification.

My invention relates to improvements in the means usually employed for edging box lumber and rendering the pieces or sections of uniform width.

In the ordinary run of machines for the purposes stated the box material, which is cut the length required and usually in width sufficient to provide for a solid end, bottom, side, or top piece, is fed to the saws by hand and then trimmed to a desired uniform width by alining one edge of the timber against a fence or gage transversely adjustable to the line of travel of the stuff as it is being trimmed. This usual method of trimming the stuff does not meet all the requirements necessary for producing pieces or sections of predetermined uniform widths, whereby two or more pieces of different width can be conveniently matched to form the required width of the sides, end, top, or bottom of the box, or for economically making said pieces, on account of the great waste of the material by reason of the irregular widths of the pieces fed to the saws to be trimmed, or for conveniently and with great capacity producing the trimmed stuff.

My invention especially seeks to provide a machine for trimming box boards, whereby boards of irregular widths as they are fed to the saws will be reduced to predetermined uniform widths proportionate to the size of the stock when fed to the saws, with the different predetermined widths of such relative sizes that two or more widths can be quickly combined to produce the desired width of the side or end of the box. For example, if the side of the box to be made is fourteen inches a piece nine and one-half wide can be matched with a piece four and one-half or a six-inch wide with one eight inches wide, and so on, and thereby provide for quickly and accurately assembling the several sections to form the desired width of the side or end portions of the box.

Another object of my invention is to provide means for automatically feeding the material to the saws and for gaging the different width pieces automatically, whereby the said pieces will be reduced to predetermined widths having a fixed degree of variation of sizes, preferably in half-inches, and for automatically assorting these different widths of trimmed stuff after they leave the trimmer-saws.

Another and essential feature of my invention lies in an automatically-operating means whereby another board or piece is brought into position onto a conveyer for leading it to the saws as a prior fed board passes off the trimmer-saws, coöperatively combined with an automatically-operating detent for holding the fence or gage to its different adjusted positions as it is set by the board fed into position onto the conveyer, and cam devices for tripping said detent at predetermined intervals.

In its more complete nature my invention includes, in a feed mechanism for pushing the boards onto the conveyer, a novel construction of board-engaging fingers adapted to slide freely under the lowermost board on their return movement and having a special correlative arrangement whereby to properly aline boards of irregular or tapering widths against the fence or gage.

In its still more subordinate features my invention consists in certain novel details of construction and peculiar combination of parts, all of which will hereinafter be fully explained, and specifically pointed out in the appended claims, reference being had to the accompanying drawings, in which—

Figure 1 is a plan view of my invention. Fig. 2 is a longitudinal section of the same, taken on the line 2 2 of Fig. 1. Fig. 3 is a transverse section taken on the line 3 3 of Fig. 1. Fig. 4 is a similar view, on an enlarged scale, on the line 4 4 of Fig. 1, illustrating the detent and tripper mechanism hereinafter referred to. Fig. 5 is a diagrammatic plan view illustrating the manner in which the feed devices for bringing the board or pieces onto the conveyer operate to move pieces of tapering or irregular widths into a proper alinement with the fence or gage member, and Fig. 6 is an inverted plan view of my invention. Fig. 7 is a detail section on the line 7 7 of Fig. 4. Fig. 7ª is a detail view on the line 7ª 7ª of Fig. 7. Fig. 8 is a detail plan view of the assorting-table, hereinafter referred to.

In the practical construction of my machine the same comprises a suitable table 1, on the under side of which in suitable bearing-boxes 2ª is journaled the trimmer-saw mandrel 2ᵇ, driven by suitable power, the saw 2 extending up through the slot 1ª in the table in the usual manner. At the discharge end of the saw is located a splitter or opener-finger 3, which may be of any approved construction.

4 designates an endless-chain carrier which travels adjacent the face of the saw and passes over a sprocket-wheel 4ª at one end and a similar wheel 4ᵇ at the other end of the table, the latter wheel 4ᵇ being mounted on a shaft 5, carrying a bevel-pinion 5ª, the purpose of which will presently appear. The sprocket-wheel 4ª is mounted on a drive-shaft 6, journaled on the under side of the table and carrying fast and loose pulleys 6ª 6ª, with which the power-belt 7 may be shiftably joined in any well-known manner.

At the front end the table 1 has a lateral extension 10, upon which the rough-edge boards or pieces are stacked in a pile, disposed with their inner edge in the longitudinal plane of the trimmer-saw, as clearly shown in Fig. 1. These boards, it should be stated, in the use of my invention need not be of substantial uniform width, but usually are, when banked in a pile of varying widths. When the box to be made has a side of, say, fourteen inches height, the minimum width of stuff used is four and one-half inches to match with a nine-and-one-half-inch-wide piece. Now, as the box boards or pieces are frequently cut from slabs, shingle-pieces, saps, &c., ordinarily wasted, and as these vary in size, to obtain a maximum width from such pieces, I have provided a fence or guide for coöperating with the saws and the means that feed the pieces to be trimmed in position on the carrier-chain, which is automatically set by the stock to be worked on and the adjustment thereof governed by width of the said stock. For example, should the stock-piece brought into position to be trimmed be more than four inches wide and less than four and one-half inches wide the fence or gage will be automatically set to hold the said stock to the saws in such manner that it will be trimmed to four inches wide. This result in a generic sense may be accomplished in various ways. In the drawings I have illustrated a simple means of this kind and which consists in a fence or gage member 8, that projects vertically from the table in a plane parallel with the trimmer-saw at a point opposing the stack of boards to be trimmed and the penetrating or cutting portion of the saw. The distance that this gage or fence is held from the saws depends on the width of the board being trimmed, and for cutting stuff to make sides fourteen inches high, the distance varies from a minimum of four and one-half inches to a maximum of nine and one-half inches.

The gage member 8 is yieldingly mounted and has a base member 8ª, slidable in a slotway 8ᵇ in the table and normally drawn to its innermost position—that is, in the direction of the trimmer-saw—by a weight, spring, or other equivalent means, springs 8ᶜ being shown in the drawings.

At the outer end the base member 8ª has a detent mechanism for holding it to its outwardly-adjusted positions. In the drawings the detent devices are in the nature of a rack-piece 9, detachably secured to the part 8ª of the gage 8, in which the teeth are spaced one-half of an inch apart, it being understood that the spacing of the teeth may be more or less, as conditions of the stock to be worked up may make desirable. Coöperating with the rack 9 is a pawl 40, which automatically rides on and locks with the rack 9 and holds the gage 8 from return movement after it is set by the stock-piece being trimmed and until said piece passes beyond the gage-piece.

11 designates a crank-shaft disposed parallel with the gage or fence member 8 below the table, which receives motion through the gear 5ª on the carrier-chain shaft 5 by suitable intermediate gearing, as shown. At one end the crank-shaft 11 has a cam 12, arranged to engage the pawl 40 at predetermined intervals and move it out of engagement with the rack 9 to permit the fence or gage to automatically return to its inner or normal position.

13 designates a plate or bar slidably held in suitable ways formed on the table, which moves in a plane parallel with the movement of the fence member 8. This bar 13 is located near the entrant end of the table and at a point midway of the stock-pile-holding extension of the table. To this arm is connected a series of pull-fingers 14 14 14ª, three being shown, two end ones, 14, and a central one, 14ª, and the said fingers move in slots 1ˣ 1ˣ 1ˣ in the table and are secured to a cross-bar 13ˣ, fixedly connected to the end $x$ thereof. The several fingers 14 14ª are of suitable shape and connected to the member 13ˣ, that they will automatically move out of an operating position—that is, project above the table-top—whereby to readily slide under the lowermost board of the pack as they move back to a board-gripping position and to automatically adjust themselves when thus moved to engage the outer edge of the lowermost one of the boards in the pack. It should be stated in the complete construction of my machine suitable means is also provided for holding the entire pack of boards except the lowermost one from moving forward by reason of frictional contact with the lowermost board as it is being drawn out onto the conveyer-chain. No special means further than a stop portion 15 is illustrated, as suitable means for this purpose will readily suggest itself to those skilled in this art.

The outer end of the member 13 is joined by a link 16 with the crank member of the crank-shaft 11.

In the practical operation of my invention it is desirable to work the stock in packs of substantially uniform widths—that is, in which the variation of the widths will not excessively differ. To provide for shifting the member 13 proportionately to the stacks of stock of different substantially predetermined widths, the said member 13 is made of sufficient length to act on the boards of maximum width to be worked, which, it is assumed, is nine and one-half inches. Assuming now the stack of boards (indicated by S in the drawings) to be not less than five or over five and one-half inches wide, and the member 13 and the crank movement is correlatively such that the complete reciprocal movement in either direction of the member 13 is nine and one-half inches, such being the case the ejector-fingers would move a distance of approximately four inches or more inward before engaging the lowermost board, which by reason of the further movement of the member 13 inward—that is, toward the conveyer-chain—will move the lowermost board out over the conveyer a distance of three and one-half inches, more or less, when the board will meet with the fence or gage, and the said fence by reason of the final outward thrust of the board to be trimmed will be pushed back to the predetermined distance, which it is assumed for illustration to be four inches from the trimmer-saws, at which position the fence will then be temporarily held by the ratchet-and-pawl mechanism heretofore described, and at which time the crank-shaft will have completed its movement in its outward or pulling direction. It should be stated in the practical construction of my machine the several coöperating mechanisms are so timed, especially as relates to the pusher-fingers on the conveyer-chains and the feed thereof, that a set of chain-held pusher-fingers come into position to engage the board moved onto the conveyer immediately after the prior board has been trimmed and the fence has been fixedly adjusted to guide the board last brought from under the stack or pile.

By the construction and coöperation of the several parts as stated the board brought from under the pile will be so guided relatively to the trimmer-saw that the rough edge will be trimmed and the said board passed out as box stuff four inches wide, the same trimming operation being effected on all the boards in the pile having a width of at least four and slightly less than four and one-half inches.

The cam devices on the crank-shaft for tripping the detent that engages the rack that holds the fence or gage to its outwardly-adjusted positions are timed to release said detent when the new board is nearly drawn out to its limit onto the conveyer-chain, thereby holding the said fence back from being engaged by the board while it (the board) still has considerable outward movement to bring it to its desired position on the conveyer.

As the rough boards frequently taper in their widths, it is essential that the edge that abuts the fence be moved into a solid alinement therewith. To accomplish this, the ejector-fingers that bring the board onto the conveyer and against the fence have a special construction, shown in detail in Figs. 3 and 6, by reference to which it will be noticed stops 20 20 are located in the path of the outer fingers 14 14, with which the holders for the fingers 14 14 engage just prior to the extreme limit of the pull movement of the member 13. The stops are so arranged as to hold back the fingers 14 14, while the central finger $14^a$ still pushes the board and causes its fence-engaging surface to properly aline with the fence or gage.

At the discharge end of the table the trimmed boards pass onto an assorting mechanism 30, which consists of a platform in the plane of the table having a longitudinal opening 31, one edge (that one in line with the fence) of which is stepped, as at $31^a$, and at each stepped part of the opening 31 is a transverse rest-rod 32. In practice the distance between each pair of rods 32 is slightly in excess of one-half the length of the trimmed board, so that as a board passes over the rod of the respective opening through which it is to pass and passes beyond its center it will drop by gravity through the proper opening. By stepping one edge of the opening 31, as shown, it is obvious by gradually increasing the opening at each step proportionately to the differential widths of the boards trimmed that the narrowest board will drop down through the first opening-section $o$, the next width of board through opening-section $o'$, and so on.

From the foregoing description, taken in connection with the accompanying drawings, it is thought the complete operation of my invention will be readily understood by those skilled in the art to which it appertains. The operation of the machine is entirely automatic and such that a single unskilled operator can control and feed a number of machines, and as the different widths of boards are assorted as they pass from the machine they can be easily bundled.

By reason of the uniform differences of board widths they can be quickly matched to produce the full width of box side required. An important advantage of my invention is that the waste of lumber is reduced to the minimum, and as the stock is automatically adjusted and fed the trimming will be uniform.

In the drawings I have illustrated a preferred coöperative arrangement of mechanical constructions for illustrating my invention; but I desire it understood that the several constructions may readily be modified or varied without departing from the broad principle of my invention or the scope of the appended claims.

Having thus described my invention, what I claim, and desire to secure by Letters Patent, is—

1. In a machine as described, the combination with the saw and bed, and the conveyer; of a fence or gage parallel with the saw, automatically shiftable by the pressure thereagainst of the stock to be trimmed, and means for automatically feeding the stock onto the conveyer and against the fence, for the purposes stated.

2. In a machine as described, the combination with the saw, the conveyer, and the bed, arranged substantially as shown; of a gage member, parallel with the saw and yieldingly adjustable to or from the saws according to the width of the stock to be trimmed, and means for automatically moving the stock onto the conveyer and against the gage, for the purposes set forth.

3. In a machine as described, a saw, a conveyer coöperating therewith, and a drive-shaft; of a means for automatically feeding the stock onto the conveyer at predetermined intervals, and a reciprocable fence or gage for coöperating with the saw, adapted to be engaged by the stock as it is fed into position and be set by the stock at a distance from the saw relatively to the width of the stock, as set forth.

4. In a machine as described, a fence or gage yieldingly movable in respect to the trimming-saw, and adapted to be set by the pressure of the stock fed thereagainst, and in proportion to the widths of said stock; in combination with means for temporarily holding the gage or fence to its set position, for the purposes described.

5. In a machine as described, the combination with the table, the saw, and the drive-shaft; of a fence or gage parallel with the saw and yieldingly movable at right angles to the saw, and adapted to be set by the pressure of the stock thereagainst proportionate to the width of the stock; of a mechanism for temporarily holding the gage to its set positions, and a trip controlled by the movement of the drive-shaft for releasing said mechanism, as set forth.

6. In a machine as described, a fence or gage, parallel with the saw, yieldingly adjustable at right angles to the saw and having means for automatically moving it toward the saw; of a detent for holding the gage at its differentially-set positions, and a cam mechanism operated from a drive-shaft on the machine for tripping said detent at predetermined times, whereby to permit the gage to move up to its inner or normal position, as set forth.

7. The combination with the conveyer, the gate or fence and the saws; of a board-feeding mechanism, including fingers for engaging the front and rear ends of the board being fed, and another finger for engaging the board at a point intermediate the other fingers, the two end fingers having a limited backward yielding motion, and stop devices for engaging the said yielding fingers as the feed mechanism nearly reaches the limit of its pull-stroke, for the purposes described.

8. In a machine as described, a conveyer, a means for automatically feeding the board to be trimmed into position to be conveyed to the saw, a gage or fence opposing said feed mechanism, yieldingly supported and adapted to be adjusted relatively to the saw, proportionately to the width of the board to be trimmed by the contact of said board therewith, a detent mechanism for holding the gage to its adjusted positions, a tripper for releasing the said detent, and a drive mechanism coöperatively joined with the conveyer, the feed mechanism, and the tripper for operating them at predetermined intervals, for the purposes described.

GEORGE ANDREWS SMITH.

Witnesses:
G. P. BORHAM,
SAML. ROBINSON.